(12) United States Patent
Saim et al.

(10) Patent No.: US 6,884,911 B2
(45) Date of Patent: Apr. 26, 2005

(54) MATERIAL PROCESSING BY REPEATED SOLVENT EXPANSION-CONTRACTION

(75) Inventors: Said Saim, New Milford, CT (US); Stephen Horhota, Brookfield, CT (US); David Joseph Bochniak, Ridgefield, CT (US)

(73) Assignee: Boehringer Ingelheim Pharmaceuticals, Inc., Ridgefield, CT (US)

( * ) Notice: Subject to any disclaimer, the term of this patent is extended or adjusted under 35 U.S.C. 154(b) by 625 days.

(21) Appl. No.: 09/774,232

(22) Filed: Jan. 30, 2001

(65) Prior Publication Data

US 2001/0055561 A1 Dec. 27, 2001

Related U.S. Application Data

(60) Provisional application No. 60/186,888, filed on Mar. 3, 2000.

(51) Int. Cl.$^7$ .......................... C07C 233/05; B01D 11/00
(52) U.S. Cl. ....................... 564/192; 427/213; 427/294; 427/296; 423/658.5; 210/768; 210/774; 264/7
(58) Field of Search .................... 564/192; 427/213, 427/294, 296; 423/658.5; 210/768, 774; 264/7

(56) References Cited

U.S. PATENT DOCUMENTS

| | | | |
|---|---|---|---|
| 4,512,846 A | | 4/1985 | Shlichta |
| 4,536,283 A | | 8/1985 | Davis |
| 4,582,731 A | * | 4/1986 | Smith .......................... 427/421 |
| 4,970,093 A | | 11/1990 | Sievers et al. |
| 4,978,752 A | | 12/1990 | Maeda et al. |
| 5,360,478 A | | 11/1994 | Krukonis et al. |
| 5,374,305 A | | 12/1994 | Glancy |
| 5,734,305 A | | 3/1998 | Ervasti |
| 5,833,891 A | | 11/1998 | Subramaniam et al. |
| 5,864,923 A | | 2/1999 | Rouanet et al. |
| 6,063,138 A | * | 5/2000 | Hanna et al. .............. 23/295 R |

FOREIGN PATENT DOCUMENTS

| | | | |
|---|---|---|---|
| EP | 0 868 942 A | | 10/1998 |
| WO | WO 90 03782 A | | 4/1990 |
| WO | WO 95/01221 | | 1/1995 |
| WO | WO 98 52544 A | | 11/1998 |
| WO | WO 98 58722 A | | 12/1998 |

OTHER PUBLICATIONS

Hannay, et al, "On the Solubility of Solids in Gases", Royal Society of London Proceedings, London, vol. 29, p. 324 (1879).

Tiltsher, et al,"A Mild and Effective Method for the Reactivation or Maintenance of the Activity of Heterogeneous Catalysts", Angew. Chem. Int. Ed. Engl. 20:892, 1981.

Larson, et al, "Evaluation of Supercritical Fluid Extraction in the Pharmaceutical Industry", Biotechnology, Progress, vol. 2, No. 2, 1986, pp. 73–82.

McHugh, et al, Supercritical Fluid Extraction, Principles and Practice, 2nd Ed., Butterworth–Heinemann, 1994, p. 369.

McHugh, et al, Supercritical Fluid Extraction, Principles and Practice, 2nd Ed., Butterworth–Heinemann, 1994, p. 191.

Donsi, et al, "Micronization by Means of Supercritical Fluids: Possibility of Application to Pharmaceutical Field", Pharm. Acta helv. 66, Nr. 5–6 (1991), P 170–173.

Francis, A. W.., "Ternary Systems of Liquid Carbon Dioxide", J. Phys. Chem., 1954, 58, 1099.

Gallagher, et al, "Gas Antisolvent recrystallization: New Process to Recrystallize Compounds Insoluble in Supercritical Fluids", 1989 Am. Chem. Soc., Ch. 22, pp. 334–354.

Yeo, et al, "Formation of Microparticulate Protein Powders Using a Supercritical Fluid Antisolvent", Biotechnology and Bioengineering, Vo. 41, pp. 341–346, 1993.

Tom, et ali, "Particle Formation with Supercritical Fluids—A Review", J. Aerosol Sci., vol. 22, No. 5, pp. 555–584, 1991.

Mohamed, et al, "Effects of Process Conditions on Crystals Obtained from Supercritical Mixtures", AIChE Journal, vol. 35, No. 2, 1989, pp 325–328.

* cited by examiner

Primary Examiner—Shailendra Kumar
(74) Attorney, Agent, or Firm—Michael P. Morris; Mary Ellen Devlin; Philip I. Datlow

(57) ABSTRACT

A method for repeatedly converting a solvent from a state of solvent to a state of antisolvent with relatively little loss of solvent. The method is used to allow for processing of large amounts of solute material with minimum amounts of solvent.

14 Claims, 10 Drawing Sheets

MATERIAL PROCESSING BY REPEATED SOLVENT EXPANSION-CONTRACTION

This application claims the benefit of U.S. Provisional Application No. 60/186,888, filed on Mar. 3, 2000, the entire disclosure of which is herein incorporated by reference.

BACKGROUND OF THE INVENTION

1. Field of the Invention

The present invention generally relates to a method for facilitating chemical processing by reducing the amount of solvent needed to conduct a processing step, while allowing for the processing of large amounts of solute material with minimum amounts of solvent. The invention further relates to methods for solvent recycling in conducting extraction, crystallization, deposition, coating, impregnation, and chemical reaction. More particularly, the present invention relates to a method of adjusting the concentration of gaseous fluids in an organic solvent so as to control the solubility of a solute in the organic solvent. In a preferred embodiment, the concentration of the gaseous fluid is repetitively adjusted so as to alternatively expand and contract the solvent volume and to convert the fluid's activity from that of a solvent to that of an anti-solvent.

2. Background of the Related Art

There are numerous methodologies known in the art that require processing of materials with solvents. Solvents are used to solubilize materials for many purposes including, without limitation, extraction, crystallization or precipitation, and reaction. Large amounts of solvent are utilized in chemical processes each year, particularly in the pharmaceutical industry. Because much of this solvent is contaminated during processing steps, equally large amounts of solvent must be disposed of annually. As many solvents are potentially toxic, disposal of these materials has become a large problem for the chemical and pharmaceutical industry.

Solvents are generally liquid in nature. However, gases have been used as solvents, in particular, when the gas is in a supercritical state. The use of gases as solvents proffer the advantage of easy disposal, and if the right gas is used, lower toxicity than many organic solvents.

Gases exist in a supercritical state when they are kept at temperatures and pressures that are simultaneously higher than both their critical temperature and their critical pressure. Many gases in a supercritical state have particularly good extraction capabilities because they display densities very close to those of liquids, with viscosities and diffusivities lying between those of gases and liquids. An extensive discussion of the many uses to which supercritical gases have been applied can be found in McHugh and Kurkonis, Supercritical Fluid Extraction (Buttersworth-Heinemann 1994).

A primary method of crystallizing materials utilizing gases in a supercritical state is known as Rapid Expansion of Supercritical Solutions (RESS) technique. In RESS a solid material which is to be recrystallized is charged to an extraction vessel and an appropriate supercritical fluid in which it is dissolvable is passed through the charge. The high pressure stream, comprised of the gas plus the dissolved solid, leaves the dissolution charge and is depressurized across a pressure reduction/flow control valve or nozzle into a lower pressure gaseous medium. Due to the sudden depressurization and loss of solvent power, particles precipitate and are collected in a collector. The key idea behind RESS is that rapid expansion of a compressed solvent in which a solute is dissolved will lead to the formation of small microparticles or nanoparticles (See, Tom and Debenedetti, 22 J. Aerosol Science 555–584, 1991).

Rapid expansion of a supercritical fluid typically results in very large supersaturation ratios (Mohamed et al., 35 AICHE Journal 325–328, 1989). It is also reported that crystals of various solid substances can be grown in good morphological quality by dissolving the solid substance in a subcritical or supercritical fluid at high pressure, and then slowly, and gradually decreasing the pressure while minimizing heat transfer between the solid-solution system and its environment (See, e.g., U.S. Pat. No. 4,512,846). RESS re-crystallization techniques have been used to recrystallized a number of compounds, including pharmaceutical preparations (See, e.g., U.S. Pat. No. 4,978,752 with respect to crystals of cephem hydrochloride). Such technique has also been used to deposit coatings and films on substrates (See, e.g., U.S. Pat. No. 4,582,731) which discloses methods for solid film deposition and fine powder formation by dissolving solid material in a supercritical fluid solution at elevated pressure and then rapidly expanding the solution through an orifice into a region of relatively low pressure; (see also U.S. Pat. Nos. 4,970,093 and 5,374,305).

The RESS technique is limited in that many compounds are not soluble in non-toxic gases. To overcome this problem a recrystallization technique referred to as the gas antisolvent (GAS) technique has been proposed. In GAS, the solid solute that is to be recrystallized is first dissolved in an appropriate organic solvent. A suitable gas having high solubility in the organic solvent and little affinity for the solute, is then passed into the organic solvent until sufficient gas is absorbed by the solution for crystallization to occur. The gas therefore acts as an antisolvent. Absorption of the gas into the solvent results in expansion of the liquid and precipitation of the solute. In an alternative approach to classic batch or continuous GAS recrystallization, and in order to enhance control on particle size, recrystallization may be performed by supercritical antisolvent recrystallization (SAS) which consists of continuously spraying a solution containing the solute to be recrystallized into a chamber filled with a supercritical fluid or into a continuous stream of supercritical fluid (See, e.g., Yeo et al. Biotechnology and Bioengineering, 1993, Vol. 41, p. 341). Other alternatives take advantage of high frictional forces (See, PCT Publication WO 95/01221) or high frequency sound waves (See, e.g., U.S. Pat. No. 5,8333,891) to cause the solution to disintegrate into droplets in order to improve crystal yield.

Both RESS and GAS techniques have also been used to effectuate size reduction (See, e.g., Larson and King, 2 Biotechnol. Progress 73–82 (1986) and U.S. Pat. No. 5,833,891 (Issue Date: November 1998)). Such techniques for reducing size have an advantage over conventional milling in that size reduction is non-destructive. Further, many compounds are extremely unstable in conventional milling processes. Mean particle sizes lower than 1 $\mu$m, with narrow particle size distribution, have been obtained by means of supercritical sprays (See, e.g., Donsi et al., 65 Acta. Helv. 170–173 (1991)).

Many gaseous fluids are soluble in organic solvents (by "gaseous fluid" is meant (1) a fluid or a mixture of fluids that is gaseous at atmospheric pressure and relatively moderate temperature ($\leqq 200°$ C.), or (2) a fluid that has previously found use as a supercritical fluid). Such fluids are at least partially soluble in the solvent of choice and can be used in either their liquid, gas or supercritical state to reduce the solubility of solid material in solvents. Carbon dioxide ($CO_2$) is highly soluble in most organic solvents. As early as the 1950's, Francis A. W. (J. Phys. Chem, 58, 1099–1114, 1954) reported on the solubility of liquid $CO_2$ in a large variety of organic solvents. Gallager et al. (Am. Chem. Symp. Series No. 406, 1989) and Krukonis et al. (U.S. Pat. No. 5,360,478) both report exploitation of the ability of gaseous $CO_2$ to dissolve in organic solvents to crystallize $CO_2$-insoluble nitroguanadine from an organic solution. Rouanet et al. (U.S. Pat. No. 5,864,923) report a similar batch method to crystallize aerogel material from organic solutions.

Presently used batch and continuous recrystallization, extraction, comminution etc., processes that utilize gaseous fluids in conjunction with organic solvents suffer from a number of disadvantages. For one, present batch and continuous processes do not provide for efficient in-situ recycling of the organic solvent. Following recrystallization, the solute-depleted solvent is not recycled in-situ to allow for re-dissolution of more solute and further recrystallization. Such processes may be extremely inefficient in particular when processing low solubility drugs. For example, for a drug with a solubility of 10 mg/mL in a particular organic solvent, a minimum of 10 liters of the solvent would be required to process 100 g of drug. Large amounts of organic solvents are therefore consumed, making the process environmentally unfriendly, costly and industrially unattractive.

SUMMARY OF THE INVENTION

The present invention provides for processing of relatively large amounts of solute material with minimum amounts of solvent through a method of recycling of solvent based on the conversion of mixtures of organic solvents and gaseous fluids from solvents to antisolvents by controlling pressure within a processing vessel with minimum loss of solvent. Conversion from a solvent to antisolvent is associated with repeated expansion and contraction of the mixture, with solute solubility decreasing during expansion and increasing during contraction. Solvent is contracted into a region containing solute material preferably in excess of its solubility in the contracted solvent. It has been discovered that by carefully, and repetitively, controlling pressure such that the liquid phase alternates between a solvent state (wherein solubilization of the solute predominates) and an anti-solvent state (wherein crystallization or other deposition of the solute or reaction product predominates) that extraction of soluble components, crystallization of solutes, and deposition of solutes or reaction products may be maximized for a wide variety of drugs and chemicals with minimal requirement for solvents. It has further been discovered that the solvent can be expanded and contracted repeatedly with minimum loss of solvent within any expansion-contraction cycle. It has moreover been discovered that because solvent expansion is accompanied by a change in the location of the liquid within a processing vessel, it is possible to separate the crystallization region from the solute dissolution region. Additionally, it has been discovered that a solvent or solution can be expanded through a filtering medium that retains undissolved material and contracted through the filtering medium to retain recrystallized or precipitated material.

The present invention further provides a process for effectuating a number of chemical processes, which conventionally require a significant amount of organic solvent, with relatively little organic solvent (thereby providing for environmentally friendly processing). The present invention provides the ability to substantially reduce the amount of solvent needed to fill a processing vessel and conduct a processing step, permitting the processing of large amounts of material with little organic solvent.

The procedure of solvent expansion-contraction may be exploited in a variety of applications of interest to the pharmaceutical, chemical and other industries, including extraction, crystallization and fractional crystallization, coating, solvent purification, chemical reaction, impregnation, improving drug substance bulk physical properties, overcoming problems with formulation development, facilitating drug substance processing, and cleaning.

In the case of recrystallization, the present invention can be used to process large quantities of material with relatively small amounts of solvent, and produce microparticles and nanoparticles of a variety of drug substances. In the recrystallization process, the solid material to be processed is typically placed near to, or within, the solvent within a high-pressure vessel. In the contracted state, the fraction of solvent in the solvent/gaseous fluid mixture is relatively high, and the mixture solubilizes some solute. Feeding or pumping of gaseous fluid into the solute solution or preferably suspension causes its concentration in the mixture to increase and the liquid phase to expand. The expanding liquid is made to pass through a filtering medium that retains unsolubilized material. Further pumping of gaseous fluid causes vessel pressure to increase and gaseous fluid solubility in the liquid to increase. Increase in gaseous fluid solubility causes a decrease in solute solubility and the solution to become supersaturated. Solute crystallization takes place when sufficient supersaturation is present. The higher the supersaturation, the larger the amount of solute recrystallized.

As crystallization takes place in conjunction with a change in the position of the solvent mixture within the vessel, the crystallized solute material can be retained on a filter, basket, or an area separate from the location of the solvent in its contracted state. Following crystallization, contraction of the liquid is effected by allowing the gas phase above the liquid to flow out of the vessel and pressure in the vessel to decrease. This causes gaseous fluid in the liquid to evaporate and the liquid to contract. This will bring fresh and purified solvent with low gaseous fluid concentration, and low solute concentration, back into contact with the solute material. Solute solubilization will again take place to dissolve more solute present in the vessel, e.g., excess solute at the bottom of the vessel or in suspension or solute that is added to the solution in the vessel following each contraction. The operation is repeated as many times as needed to dissolve all available solute, or a substantial portion thereof, and deposit the recrystallized solute on the filter. In general, the process is repeated until at least a substantial portion of the solute is recrystallized. In this context, a "substantial portion" generally means at least about 50% of the dissolved solute, preferably at least about 80%, and more preferably at least about 99%. Some solvent may be added to make up for solvent lost during pressure letdown if desired. This recrystallization process is especially attractive for processing low solubility drugs, which would otherwise require large amounts of solvent to process relatively small amounts of drug. The rate of solvent expansion and the extent of expansion can be used to control some properties of the crystallized material such as particle size. As at the end of the process the solvent in its contracted state contains little solute, and the spent solvent may be reused in processing the same solute to save on solvent and solvent disposal cost.

The main advantages of the present invention over conventional processing involving organic solvents or supercritical fluids are: (1) small amounts of solvent can be used to process relatively large amounts of material (the same solvent can be repeatedly (possibly more than 20 times) used in-situ in processing solute material); (2) the simplicity and flexibility of the process opens avenues for new applications of interest to the pharmaceutical and chemical industry; (3) solid or organic solution handling is minimized throughout the process; (4) the process offers the possibility of reusing the solvent and recycling the effluent gaseous fluid and solvent; and (5) the process typically employs pressures that are relatively lower (usually $\leq 90$ bar at 35° C.) than in corresponding supercritical fluid processes (capital and operating costs are therefore reduced when compared to corresponding processes).

DETAILED DESCRIPTION OF THE INVENTION

Figure 1:
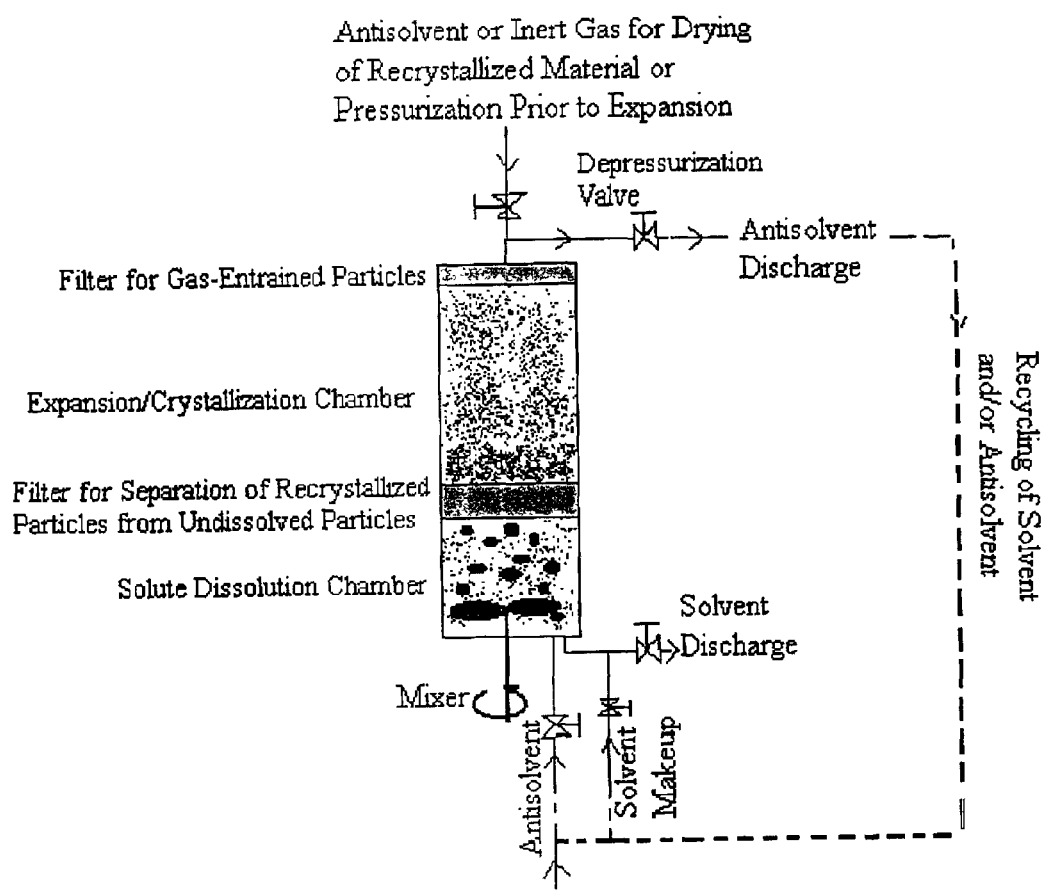
FIG. 1 is a schematic drawing of apparatus used to practice an aspect of the present invention.

The solubility of gaseous fluids in organic solvents generally increases with increasing pressure. Dissolution of gaseous fluids in organic solvents is typically accompanied by an increase in the volume of the liquid mixture. Applying these principles, it has been discovered that a solvent/gaseous fluid liquid phase can be repeatedly converted from a mixture displaying solvent activity into a mixture displaying antisolvent activity, and vice versa. Increasing pressure by pumping fluid into the vessel has the effect of expanding the solvent. Conversely, reducing pressure by purging the gas phase, which is composed mostly of gaseous fluid, out of the vessel has the effect of contracting the solvent.

Preferably, when operating at conditions of pressure where the solvent would expand to very high levels, pressure modulation of the expanded solvent/gaseous fluid liquid phase in the present invention is effected so as to ensure that the liquid phase does not fill the volume of the vessel completely, keeping the liquid mixture in contact with a gaseous phase throughout processing. When $CO_2$ is used as the gaseous fluid, it has been noted that even at pressures where $CO_2$ is fully soluble in the organic solvent, the volume can be controlled by modulating pressure within a small range to allow for solute crystallization to take place for any desired period of time.

In order for efficient operation of the present invention to take place, solute material to be extracted, crystallized, deposited etc. must have a lower solubility in the gaseous fluid than in the solvent, and should preferably display considerable solubility in the solvent employed in the process. Preferably, pressure reduction is achieved by purging the gas phase over the liquid phase out of the vessel such that little solvent is lost because the solubility of the solvent in the gas phase is relatively low. Generally, the pressure is reduced to a level such that a substantial amount of the gaseous fluid is expelled from the liquid phase, for example, at least about 50% of the gaseous fluid is expelled, preferably at least about 80%, more preferably at least about 99%. Removal of the gaseous phase, which contains little solvent, causes vessel pressure and gaseous fluid concentration in the liquid phase to decrease, and the liquid phase to contract. The liquid phase can be repeatedly contracted to a level close to its original volume prior to mixing with the gaseous fluid.

Preferred gaseous fluids that can be employed in the present invention include nitrous oxide, trifluoromethane, ethane, ethylene, propane, sulfur hexafluoride, propylene, butane, isobutane, pentane, and mixtures thereof. As would be recognized by one of ordinary skill in the art, however, any other gaseous fluids of relatively high solubility in the organic solvent employed may be used. A particularly preferred gaseous fluid due to its low toxicity and reactivity is $CO_2$.

Solvents utilizable in the present invention include both organic and inorganic solvents. Preferably organic solvents are employed. Organic solvents which may be used in the present invention include, but are not limited to, ethanol, methanol, acetone, propanol, isopropanol, dichloromethane, ethyl acetate, dimethyl sulfoxide (DMSO), hexane, and mixtures thereof. Water may also be present in the solvent/gas mixture if the gaseous fluid is soluble in the water/solvent mixture. For example, water may be present in ethanol when $CO_2$ is used as the gaseous fluid as the solubility of $CO_2$ in sixty-percent ethanol/water mixture can be as high as fifty percent.

One application of the present invention is in processes involving chemical reaction(s). In this case, the composition of any reaction mixture employed in the presently disclosed process will depend, of course, on the specific solute, solvent, reactants (or products/intermediates) involved.

As would be understood by one of ordinary skill in the art, the presently disclosed process would be run at different optimal temperatures and pressures depending on the chemical species involved and the nature of the process being performed. For $CO_2$ in most organic solvents, a temperature range of 0–50° C. and a pressure range of 20–100 bar is preferred.

It has been discovered that a number of organic solvents can be repeatedly expanded to several-fold (up to 30 times) their original volume at atmospheric pressure and contracted to their original volume prior to mixing with the gaseous fluid. The rate of expansion and the level of expansion are controlled by the rate of pressurization with the gaseous fluid and pressure modulation of the expanded state respectively. Crystallized solute may be retained on a filter, in a basket or some other trapping device. There is normally no need for cyclones to trap formed particles because the particles are crystallized within a liquid mixture. Antisolvent can be used to dry any crystalline material isolated if needed.

The solvent/gaseous fluid liquid phase is preferably contracted back to a level where solute solubility is substantially higher than in the expanded liquid. The contracted liquid should contain substantially less antisolvent than the expanded liquid. Contraction of the solvent may be achieved by purging the gaseous phase above the liquid phase out of the crystallization vessel. Solvent expansion and contraction may also be possibly effected with virtually no loss of gaseous fluid or solvent through the use of a moving piston within the processing vessel that would compress the gas phase into the liquid during the expansion phase and reduce pressure and gaseous fluid content in the liquid phase during the contraction phase.

Typically, the effluent gas should contain relatively small amounts of solvent and should be substantially solute-free, especially when operating at low pressures and temperatures (for example, the concentration of ethanol in an effluent from a $CO_2$/ethanol atmosphere should be less than 3% at 35° C. and pressures of about 70 bar—lower concentrations of less volatile solvents, such as DMSO, would be expected). In one preferred embodiment, expansion is conducted until virtually all dissolved material is recrystallized and contraction is performed to a point such as the original solute/solvent level in the crystallization vessel prior to expansion. The expansion-contraction procedure is preferably repeated until most or all of the solute is used up and recovered on the retention system used. Preferably more than three, more preferably more than five, and yet more preferably more than ten repetitions of the expansion-contraction procedure should be undertaken. Effluent organic solvent can be recovered with high efficiency in a cold trap and then recycled into the process, and may be recycled separately from, or together with, effluent gas.

The level of expansion increases with an increase in pressure and a reduction in temperature at any given pressure. It has been found that for $CO_2$ at pressures up to 60 bar and temperatures at or above 35° C., expansion is relatively modest (generally less than 300%), and the volume stays relatively constant at any given pressure with no need for pressure modulation. Above this pressure, e.g., between 60 and 90 bar, a small increase in pressure can result in a sharp increase in the volume of the liquid, indicating that large amounts of gaseous fluids are being solubilized in the liquid.

A preferred operating range for $CO_2$ at 35° C. in the non-expanded state for most organic solvents is between about 0 to about 60 bar, while in the expanded state it is from about 50 to about 90 bar, more preferably from about 70 to about 90 bar to effect substantially complete crystallization. Of course, the range of pressures where the solution may be controllably expanded can change depending on the temperature and the nature of the solvent. At a certain point within this range, expansion rates are high and the liquid could reach the capacity of the vessel. Should the liquid level reach the top of the vessel, pressure reduction within the vessel could necessitate the removal of solvent from the vessel. It is found that simple fine-tuning or change of pressure within a narrow range through purging and pumping of small amounts of $CO_2$ is typically sufficient to maintain the liquid level nearly constant at any location below the top of the vessel. This provides a means to allow for crystallization to take place for any desired period of time. Because of the sharp change in the solubility of $CO_2$ in many solvents within this pressure range, fine-tuning within ±1 bar is often sufficient to maintain a constant volume. Operation within a wider range of pressures is also possible; for instance, expansion pressures between 60 to 100 bar are possible if relatively larger fluctuations in liquid level are acceptable. Gaseous fluid concentration and expansion levels can be controlled over a wide range. Expansion levels up to thirty-five times of the original volume of the organic solvent prior to expansion, resulting in an expanded liquid containing roughly 3% solvent and 97% gaseous fluid, can be obtained. Contraction back to nearly the original solvent volume prior to mixing with $CO_2$, where the solvent can be nearly gaseous-fluid-free, are possible. Solvents can thus be continuously converted from nearly $CO_2$-free to nearly organic-solvent-free, i.e., from solvents into antisolvents.

The disclosed process may also be employed to produce crystalline material with controlled size and morphology. The ability to rapidly increase supersaturation may be used to produce smaller microparticles and nanoparticles of a drug substance, particles that may improve the bioavailability of low solubility drugs can be useful as drug powders suitable for inhalation. The disclosed process may further aid in processing difficult-to-comminute drugs, such as proteins.

A stagewise recrystallization process may be employed wherein either several expansion vessels in series, or an expansion vessel incorporating several regions separated by filter media, are used to fractionate the crystalline material according to size or other crystalline property. In this case, during expansion, the first crystals may start to appear when the level of liquid in the expansion vessel is relatively low (in this region, as drug concentration is relatively higher, nucleation as well as growth rates may be greater). As the solution expands further, the gaseous fluid concentration in the solution increases, but the concentration of solute decreases. This may lead to changes in nucleation and growth rates, which may have an effect on crystal size, morphology, impurity profile and other properties. The dynamic change in crystallization conditions as the solution expands can be exploited in the fractionation of crystals according to a specific property of interest.

Besides crystallization, the disclosed process provides an efficient extraction method allowing material to be extracted from a composition with minimum amounts of solvent. The process finds particular usefulness in extracting most polar or high molecular weight substances, including natural products from animal and vegetable sources. In the extraction process, the material to be extracted is preferably placed near, or within, the organic solvent. After extraction, the solvent is expanded to precipitate or crystallize the material. The crystallized material is trapped on a filter material, in a basket or by some other trapping means. The trap is preferably located away from the material to be extracted. The solvent mixture is then contracted down to the level of the substrate material to provide fresh solvent for extraction. The operation is repeated until the composition is depleted of most of its extractable material, e.g., until the composition is substantially free of said material. In this context, "substantially free" means that the composition contains less than about 50% of the material, preferably less than about 10%, most preferably less than about 1%. Such extraction process may advantageously be used, for example, to purify drug substances. If the impurity or the drug is soluble in the organic solvent and $CO_2$, it may then be kept in solution while the drug or the impurity respectively is recrystallized to its purer form.

Advantages of the presently disclosed process in extraction over conventional extraction processes involving the use of organic solvents or a mixture of an organic solvent and a gaseous fluid may include: (1) minimum consumption of the organic solvent and gas, and relatively low operating temperatures and pressures enhance the environmental friendliness of the process and reduce operating and capital costs; (2) the solvent power and selectivity can easily be adjusted by controlling the amount of gas in the contracted solvent; (3) the typical pressures employed in the process are lower than in conventional supercritical fluid extraction with modifiers; (4) the solvent can be reused for extraction; (5) little or no extract is typically lost (the effluent contains virtually no solute because operation can take place at relatively low temperatures and pressures—loss of solute can take place in supercritical fluid extraction because the solute is solubilized in supercritical $CO_2$/modifier and the extract needs to be trapped following expansion to lower pressures).

The disclosed process may also be used to coat substrates, such as tablets, powders, metallic material, plastic material, food, or other material. In this embodiment, the substrate is brought into contact with the expanded solution containing the coating material. Being insoluble in the gaseous fluid chosen, the coating material precipitates or crystallizes upon coming into contact with the surface of the substrate. The expansion-contraction procedure is repeated until the desired amount of coating is deposited on the substrate. Optionally, the coating may be dried with the gas utilized in between expansion and contraction steps. Tablets and powders may be kept fluidized with the gas during drying, preventing the tablets and particles from aggregating.

Other uses for the presently disclosed process include impregnation of porous substrates and cleaning. In impregnation, material accumulates in the pores of a matrix and the expansion-contraction process is repeated until the matrix is adequately impregnated with the material. What would be considered adequate impregnation will depend, of course, on the purpose and intent of the impregnation, the type of matrix and material to be impregnated. One skilled in the art could easily determine what is adequate depending on the context. In general, however, an adequate impregnation would be at about 50%. Impregnation provides a means for incorporating small particles of low solubility drugs in porous carriers. Cleaning, on the other hand, involves the removal of small amounts of contaminants from external surfaces, internal surfaces or interstices.

The present invention provides a process by which contaminated material is removed from a desired product. The contaminated material may be found in drug substance powders, capsules, glass vials, clothes, electronic components, or even hazardous waste drums. The contaminated material may be kept agitated with an impeller or other means of mixing. In order for such cleaning process to take place, the contaminants that are desired to be removed are preferably soluble in the expanded solvent. The process is meant to extract the contaminants (which are in low concentration) using the expanded solvent. Contaminants are then removed along with solvent during the contraction phase. The contraction serves to remove the liquid phase from the contaminated material, leaving the contaminated material in contact with an essentially dry, gaseous phase. At least one expansion-contraction cycle is needed, but the expansion-contraction cycles may be repeated until the contaminant is adequately removed from the contaminated material. What would be considered adequate removal will depend, of course, on the material and its use, and the type of contamination. One skilled in the art could easily determine what is adequate depending on the context. Generally, however, an adequate removal would mean removing at least about 90% of the contamination, preferably at least about 95%, more preferably at least about 99%, depending on the context. The solvent may be reused because contaminant concentration is generally low. Containers such as bottles, cans and drums may be cleaned by loading them into the expansion vessel with their open end facing the oncoming expanding solvent. Sealed or hermetically closed containers may be cleaned by piercing the same at a few locations to allow the solvent to freely penetrate and exit the containers. This process is especially attractive for cleaning difficult to reach regions of a material such as pores and interstices.

In the case of clothing, the process offers the advantage of the use of small amounts of solvent to clean large amounts of clothing. The solvent may then be recycled to treat other batches of clothing (while minimizing human contact). In order to reduce solvent and antisolvent losses, following cleaning, a slight contraction to below the lower level of the clothing material may be sufficient. Clothing material is preferably housed in a vessel or apparatus that is separate from the vessel housing the solvent. Cleaning can be repeated as often as desired before final drying and pressure reduction in the expansion vessel is undertaken. Repeated expansion and contraction of solvent allows for renewal of the interface between the solution and the soiled or contaminated material which results in higher mass transfer rates. Surfactants may also be used to enhance extraction rate.

The present invention may also find application in chemical reaction systems. It is especially useful for reactions where the reactants are soluble in the solvent/gaseous fluid mixture but the product(s) of a reaction between the reactants is not. It is preferable, but not mandatory, to use a gaseous fluid that is non-reactive with the reactants and reaction products. This procedure can also be used to minimize the formation of side products. In this procedure, the solvent is employed to solubilize the reactants. In homogeneous reaction systems, the solution is then expanded to precipitate the product on a filter, basket or separate vessel. In the case of catalytic reactions, the reaction mixture is brought into contact with a catalytic bed, the reaction initiated and the product mixture expanded to precipitate the product onto a retaining device. The solvent mixture is then contracted back to solubilize reactants and/or come into contact with the catalyst bed, and the operation is repeated until completion. The invention may also be used to improve the rates of catalytic reactions such as alkylation. In this case, the reaction is conducted in the expanded solvent/gaseous fluid medium. Pressure modulation is then used to expand and contract the fluid mixture. Contraction causes reaction products or undesirable byproducts or catalyst coking or fouling material in the catalyst pores to exit the catalyst. Expansion causes reactant(s) to penetrate active catalytic sites in catalyst pores, thereby increasing reaction rates.

As illustrated in FIG. 1, a single vessel may be used to conduct the processes of extraction and crystallization etc. In this case, a solution, or preferably a suspension of the solute substrate and the organic solution is present in the solute dissolution chamber. They are preferably mixed with an impeller or some other form of mixing to increase solute dissolution rate. The solution is expanded using a gaseous fluid, preferably $CO_2$. The solution expands through the filter medium into the expansion/crystallization section of the vessel, i.e., the expansion/crystallization chamber. Above a certain level, substantial crystallization starts to take place within both the dissolution section as well as within the crystallization section of the vessel. Recrystallized solute material is retained on the filter. Contraction is then effected by opening the depressurization valve until the solvent passes through the filter back into the solute dissolution chamber. At the end of the expansion-contraction steps, residual solvent may be drained out of the vessel and gaseous fluid may be used to dry recrystallized material.

The onset of solvent expansion within the solute dissolution section of the vessel as well as the rate of expansion, the extent to which the solvent is expanded and the size of the crystallization section should be optimized to ascertain that crystallization takes place overwhelmingly within the crystallization section. If the solute is dissolved within the contracted fluid to near its solubility limit, the liquid should preferably be contracted back to a level such that the chamber where solute dissolution takes place is substantially filled with liquid. This will prevent crystallization from taking place to a large degree within the dissolution chamber during the expansion phase of the process. If the solute is dissolved in the contracted solvent to below its saturation, then a substantial amount of expansion may be possible before crystallization takes place. Because of the low viscosity of mixtures of solvent and gaseous fluid, a high rate of solvent expansion through the filter medium may be achieved. This could result in crystallization taking place mostly in the crystallization section of the processing vessel. Gaseous fluid and/or inert gas may also be rapidly fed through the top of the vessel up to a desired pressure prior to starting the expansion step. This would cause the expansion to start at a relatively high pressure, and the solution to rapidly expand into the crystallization section of the vessel. Alternatively, when possible, pressure at the end of the contraction step should preferably be close to that at which a steep rise in the liquid would take place with small increases in pressure. This will allow for rapid expansion into the crystallization section and cause a large fraction of the solute material to crystallize in the crystallization section.

The rate of contraction should be slow enough to avoid entrainment of liquid droplets in the gas phase which may cause loss of solvent and possible re-dissolution of recrystallized material. The filter medium should preferably allow for fast flow of liquid from the crystallization section to the dissolution section. In order to avoid buildup of liquid material on top of the filter due to surface tension, the contraction step should be slowed down when the liquid level reaches the filter medium. Gaseous fluid directed at the surface of the filter may also be used to evaporate any residual solvent or to force the liquid through the filter. Excess solute material in the dissolution vessel may be present either as solid particulate material in direct contact with the solvent or as solid material in porous or microporous bags. Alternatively, solute material sufficient to nearly saturate the contracted solvent may be fed into the dissolution section following each expansion-contraction phase.

Figure 2:
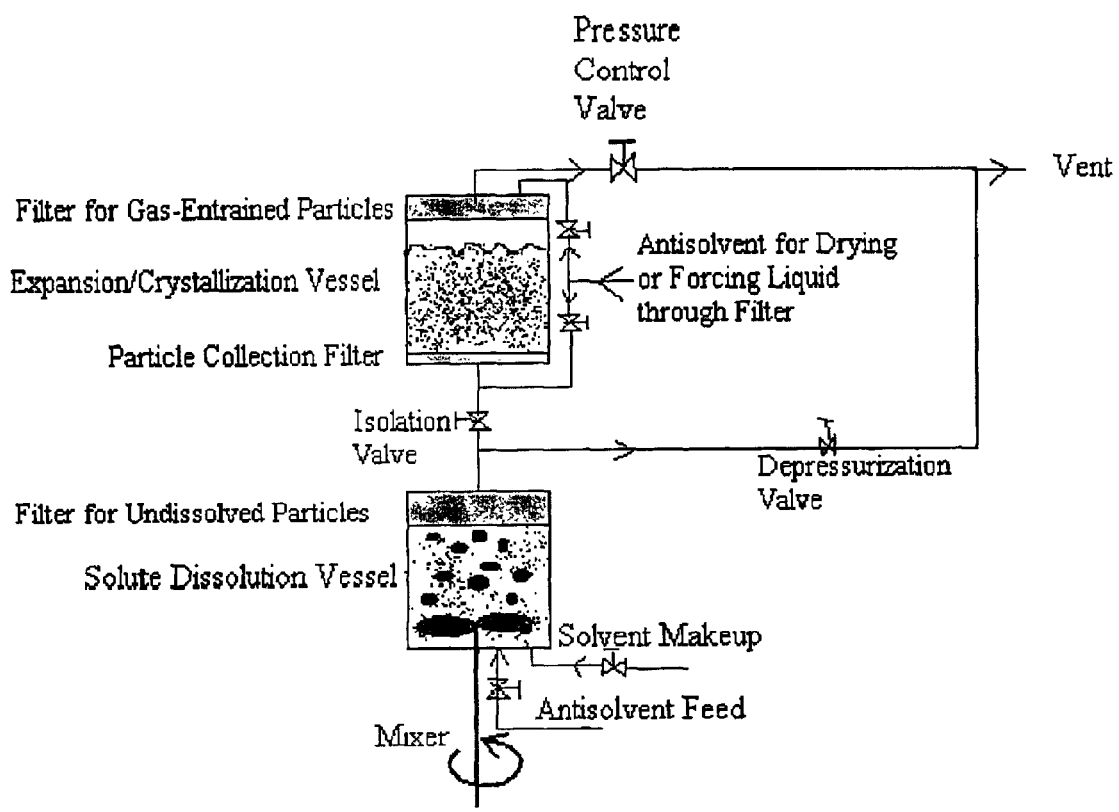
FIG. 2 is a schematic drawing of apparatus used to practice an aspect of the present invention.

A variety of different configurations may be envisioned. For instance, as illustrated in FIG. 2, the solute dissolution section may be in a separate vessel by itself. Upon expansion, the crystallization vessel may be isolated from the solute dissolution vessel using the isolation valve. The solute dissolution vessel pressure may then be depressurized by opening the depressurization valve. The next cycle may start by expanding the solution in the solute dissolution vessel. Alternatively, the isolation valve may be opened to allow for solvent/gaseous fluid mixture in the crystallization vessel to flow back into the solute dissolution vessel followed by expansion from the solute dissolution vessel into the crystallization vessel. This alterative process has the advantage that recrystallized solute material is always in contact with a relatively high gaseous-fluid-content solution in which it is not soluble. Antisolvent may be used to dry recrystallized particles at the end of a contraction step, especially particles on the surface of the filter where, because of surface tension, liquid may accumulate and potentially redissolve recrystallized particles. Antisolvent or inert gas may be used to aid in filtering liquid by pressing the contracting liquid through the particle collection filter and the filter for undissolved particles.

Figure 3:
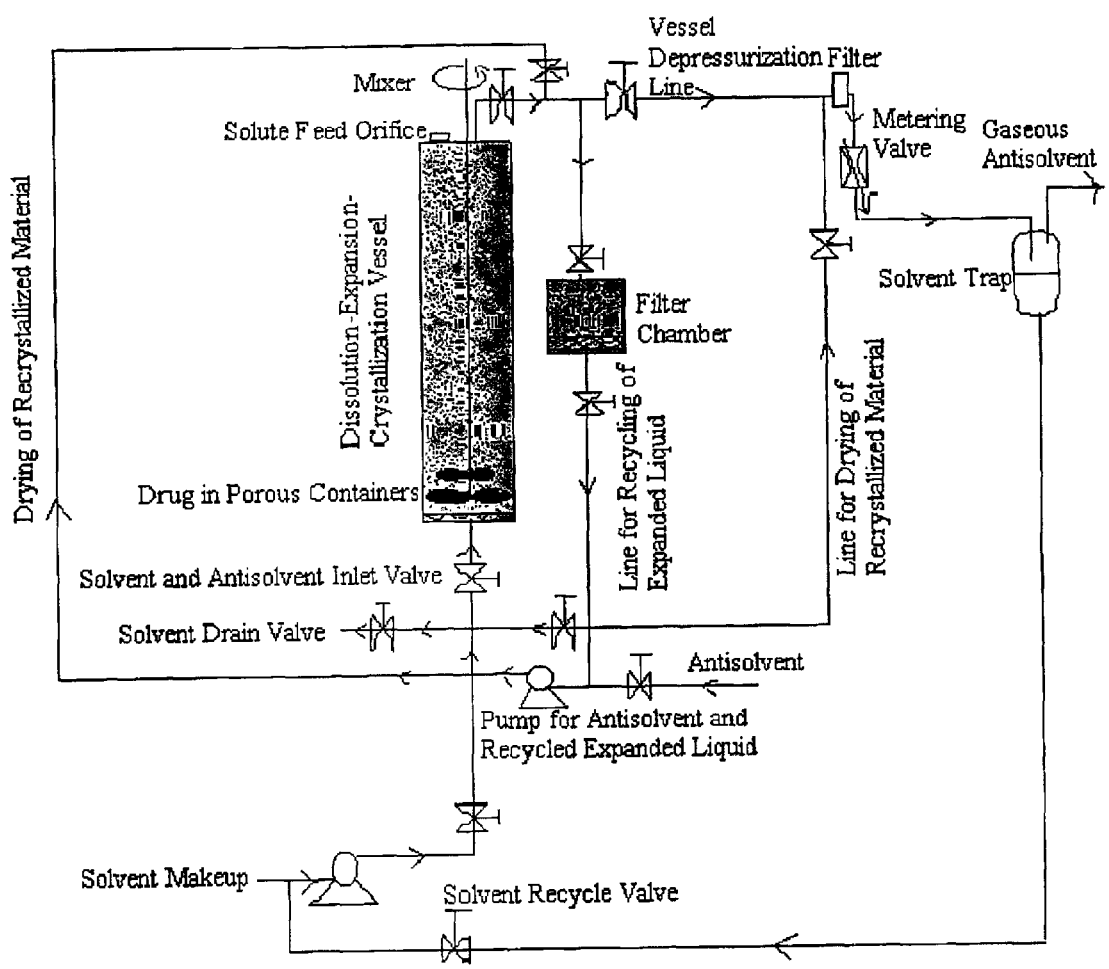
FIG. 3 is a schematic drawing of apparatus used to practice an aspect of the present invention.

Other alternative practices may be employed, including the use of a pump to recycle the expanded liquid into the dissolution vessel while the recrystallized particles are trapped on a filter within the filter chamber (FIG. 3). In this case, solute material is either kept in porous containers or periodically charged into the dissolution-expansion-crystallization vessel following each expansion-contraction cycle. First, expansion is effected by feeding antisolvent into the dissolution expansion-crystallization vessel. Recrystallized particles are directed towards the filter chamber by recycling of expanded liquid throughout the system using a pump. Recycling is continued until most recrystallized particles are collected in the filter chamber. The filter chamber is then isolated by closing valves directly upstream and downstream the filter chamber, the liquid in the dissolution and crystallization vessel is contracted and more solute is allowed to dissolve in the contracted liquid. The process is then repeated until all solute material has been recrystallized.

Vessels may be set in their horizontal, inclined or other position. It is preferred that crystallized material be collected in a region separate from that of the solvent in its contracted state. It is also preferred that the antisolvent be fed into, or brought into contact with, the solvent. If the solid material is not directly in contact with the solvent, the solvent may be expanded until it comes into contact with the solid material in either the same vessel as the solvent or in a separate vessel, such that solute solubilization may take place.

EXAMPLE 1

Ability to Control the Level of Solvent in Solvent Expansion-Contraction Procedure The present invention was seen to permit control of the volume of the solvent in a view cell by increasing or reducing pressure through ingress or egress of $CO_2$. At any temperature, the level of solvent was found to be able to be maintained at any location below the top of the vessel or within a desired range using small changes in pressure. This was accomplished even when operating at conditions where expansion increases sharply with increasing pressure. Furthermore, it was observed that the solvents could be expanded and contracted a multitude of times before incurring a major depletion in solvent. Solvent losses within any single expansion-contraction cycle were seen to be relatively small, and could be minimized by using lower volatility solvents such as DMSO or operating at low temperatures. Furthermore, solvent lost through the vapor phase may be recycled, thereby allowing for a large number of expansion-contraction cycles.

EXAMPLE 2

Solvent Expansion-Contraction Technique

Solvent expansion and contraction experiments were conducted using an 80 mL high pressure view cell equipped with a sapphire window along its length. An inlet valve was used to isolate the view cell from the $CO_2$ feed section and/or to allow $CO_2$ into the view cell. An outlet valve was used to contain the vapor phase within the view cell or to allow it to exit the view cell.

The volume associated with any location within the view cell was noted on a band taped to an external side of the view cell. Ethanol or DMSO was first poured into the vessel. The vessel was then put in an oven. After thermal equilibration, some $CO_2$ was allowed to flow through the bottom of the vessel and through the solvent. The outlet valve was kept in its off position. The volume of the liquid was then noted. After the level appeared to have stabilized, more $CO_2$ was allowed into the view cell to determine the new level at the new pressure. The liquid level appeared stabilized within a few minutes. Contraction, which was effectuated by allowing increasing amounts of the vapor phase to exit the view cell, was started when the fluid level has reached nearly the upper level of the view cell window. Liquid volume was noted following each incremental decrease in pressure. Stabilization of the liquid volume appeared to take place within a few minutes.

Figure 4:
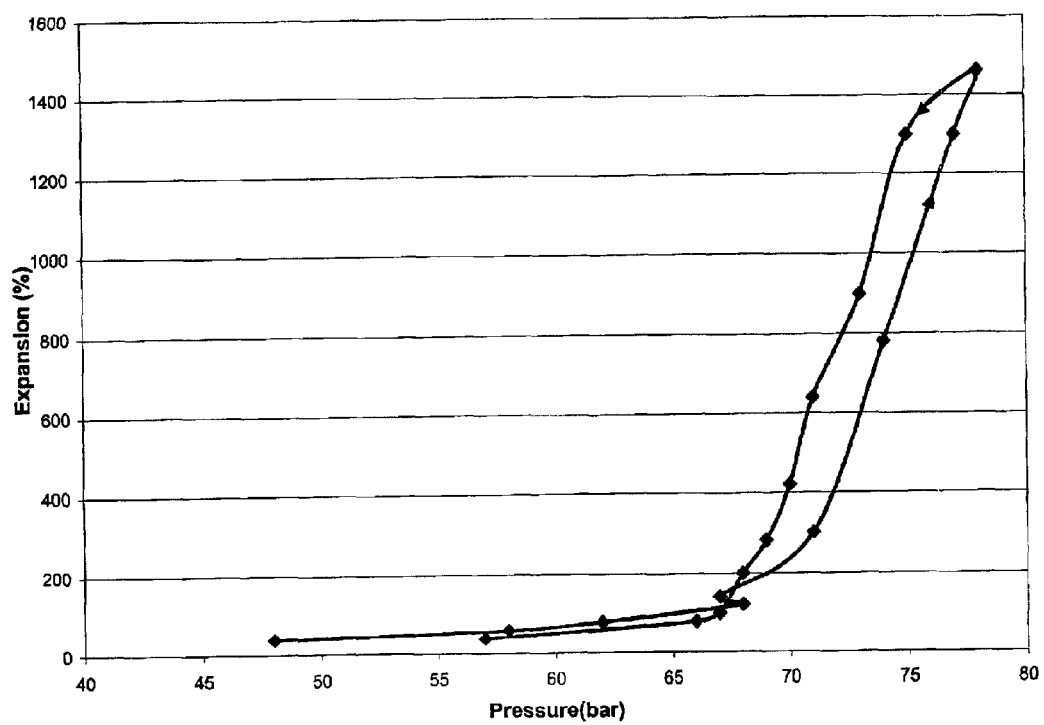
FIG. 4 shows the effect of pressure on expansion and contraction of 5 mL of ethanol with $CO_2$ at 35° C.
Figure 5:
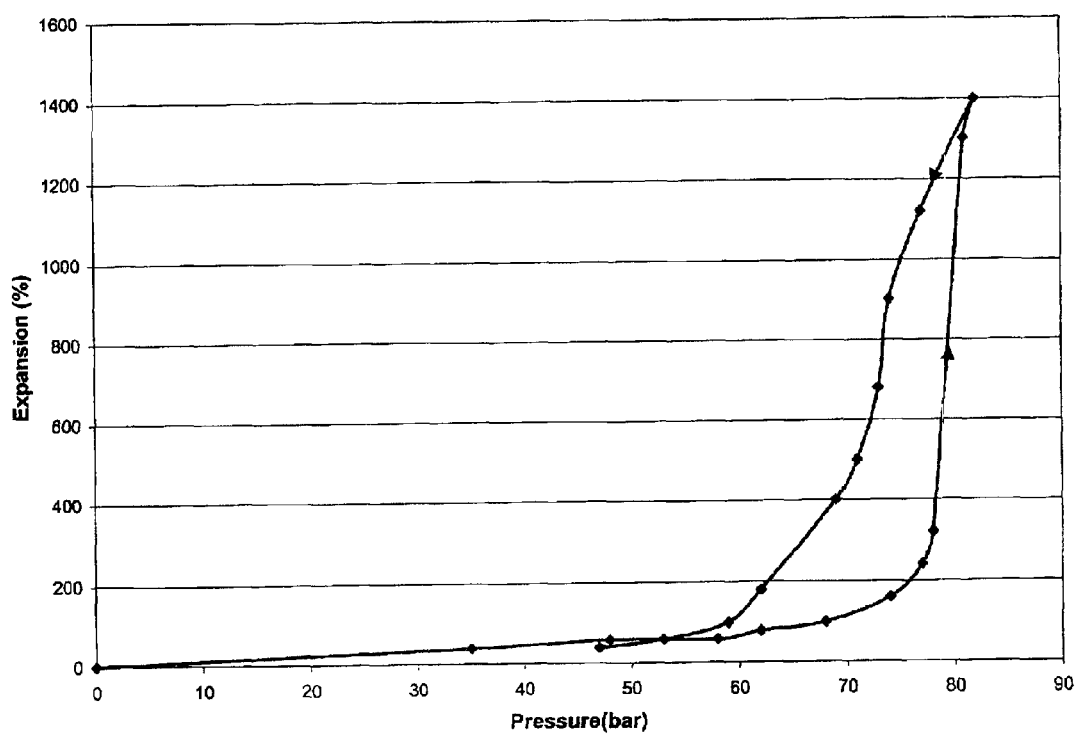
FIG. 5 shows the effect of pressure on expansion and contraction of 5 mL of DMSO with $CO_2$ at 35° C.

FIGS. 4 and 5 illustrate the changes in volumes of 5 mL of ethanol and DMSO (respectively) with pressure at 35° C.—solvent expansion (lower curves) during pressure buildup as well as solvent contraction during pressure reduction (upper curves) are shown. Relative expansion is defined as the difference between the expanded volume and the initial volume divided by the initial volume times 100.

Longer times need to be allowed for the liquid to stabilize during the expansion phase, especially when using DMSO. DMSO is relatively more viscous (2.0 cp) than most organic solvents and mass transfer rates of $CO_2$ into the solvent are therefore lower. Equilibrium expansion levels can be obtained by allowing more time for equilibrium to take place or by continuously flowing $CO_2$ through the solvent at constant pressure until no change in solvent volume is observed. The latter could lead to some solvent losses to vapor phase. Mixing of the liquid may be used to improve mass transfer rates of $CO_2$ into the liquid phase. In the absence of mixing, the equilibrium expansion level can be reached more rapidly by starting from an expanded state and gradually reducing pressure.

Figure 6:
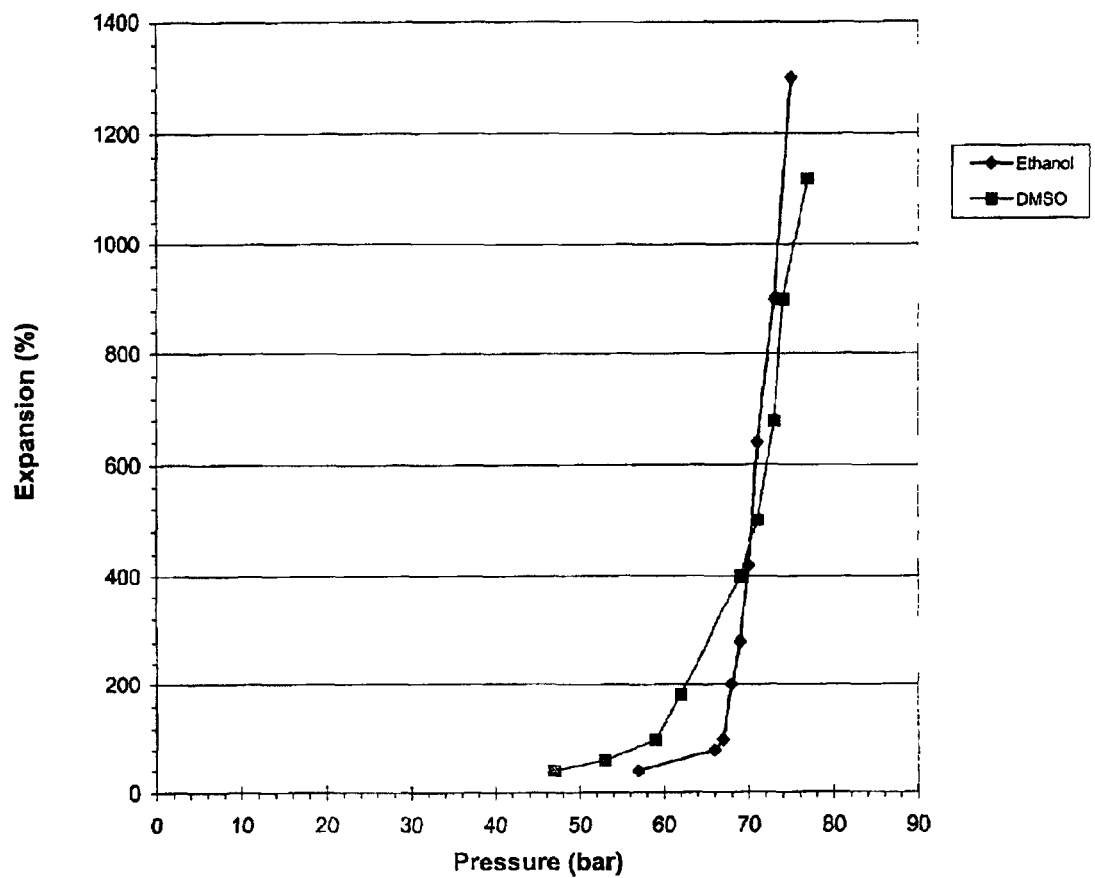
FIG. 6 shows the relative expansion of 5 mL of ethanol and 5 mL of DMSO with $CO_2$ at 35° C. during the contraction phase
Figure 7:
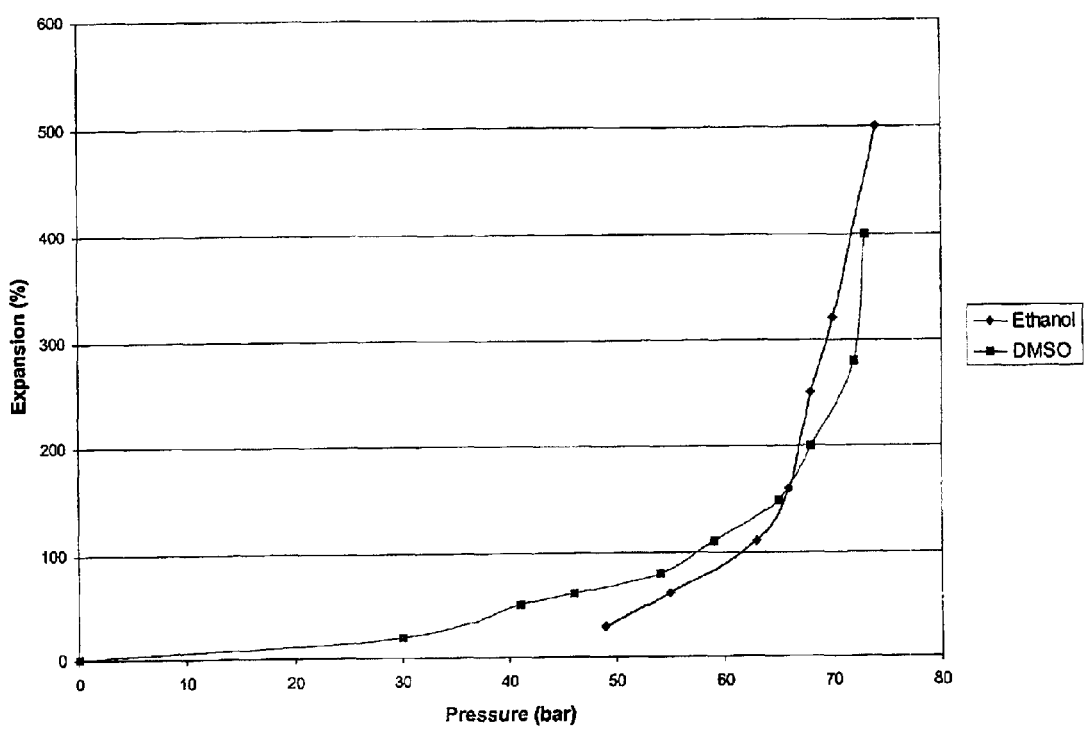
FIG. 7 shows the relative expansion of 10 mL of ethanol and 10 mL of DMSO with $CO_2$ at 35° C. during the contraction phase

Higher volumes were noted during the contraction phase because the liquid starts as a supersaturated state and proceeds towards a saturated state as pressure is reduced. The volume at any pressure should therefore not fall below equilibrium level. A stable volume is reached when no $CO_2$ bubbles are observed to exit the liquid-vapor interface. The contraction curves can thus be considered close to the equilibrium curves. FIGS. 6 and 7 combine the contraction curves of ethanol and DMSO for the cases where 5 mL and 10 mL of solvent are used (respectively). As expected, these curves are similar ($CO_2$ exhibited similar solubility in each organic solvent).

Figure 8:
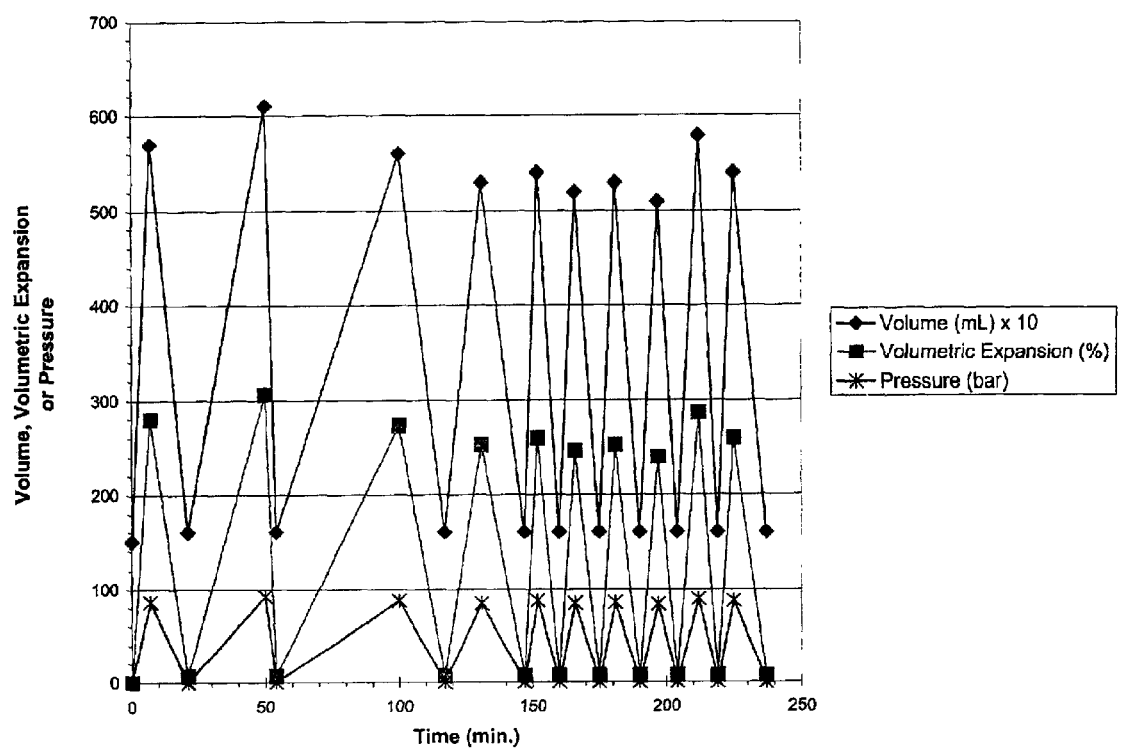
FIG. 8 shows the volume, expansion level and pressure of 15 mL of DMSO repeatedly expanded and contracted with $CO_2$ at 35° C.

FIG. 8 shows the change in volume, volumetric expansion and pressure throughout 10 DMSO expansion-contraction cycles. Increase in volume and expansion takes place during the pressure increase step. Decrease in volume and contraction takes place during the pressure reduction step. FIG. 8 shows that DMSO can be repeatedly expanded to relatively high volumes and contracted back to nearly its original volume of 15 mL using $CO_2$ at 35° C. The volume of DMSO after contraction (the lower level diamond symbols) is nearly constant throughout the 10 expansion-contraction cycles. DMSO can thus be repeatedly changed from solvent to antisolvent with little loss in solvent, demonstrating the utility of this invention in solvent recycling and in reducing solvent consumption. The duration of a step or cycle can be either nearly constant or variable. The presence of a solute in the solvent would generally have little effect on the expansion-contraction profile and would not be expected to significantly enhance solvent loss.

Figure 9:
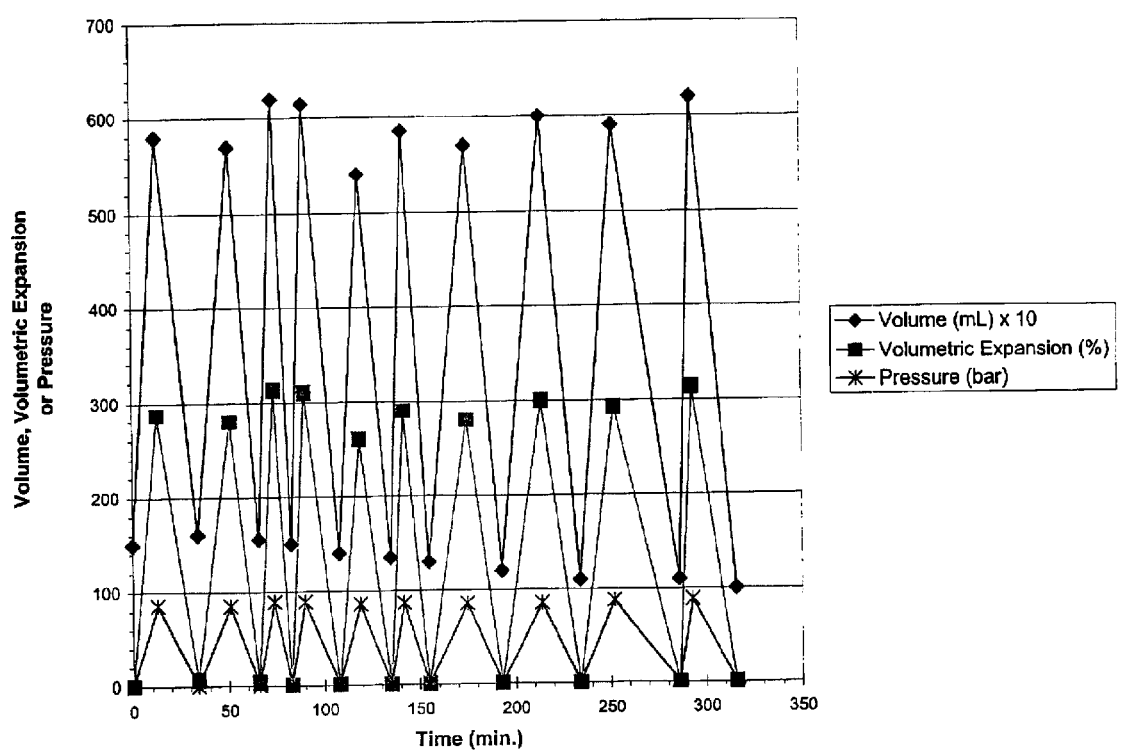
FIG. 9 shows the volume, expansion level and pressure of 15 mL of ethanol repeatedly expanded and contracted with $CO_2$ at 35° C.

FIG. 9 shows that ethanol can be repeatedly expanded to relatively high volumes and contracted back to close to its original volume of 15 mL using $CO_2$ at 35° C. Some loss of ethanol is, however, noticeable after a few expansion-contraction cycles, as indicated by the decreasing volume of the contracted liquid (lower diamond symbols). Indeed, ethanol is more volatile than DMSO, and ethanol loss from purging of the vapor phase would therefore be more appreciable. After 10 expansion-contraction cycles, about ⅔ of the original amount of ethanol still remains in the view cell, indicating that even volatile solvents can be efficiently recycled. Solvent loss can be reduced by either decreasing temperature, reducing the level to which the liquid is expanded or increasing the level to which the liquid is contracted. Note that in the case of ethanol, a second, lighter liquid phase of relatively small volume ($\leq 4$ mL) was observed on the expanded liquid phase.

EXAMPLE 3

Extraction by Solvent Expansion-Contraction

The ability of expanded solvents to clean or extract liquid and solid substances was tested. Either a solid drug substance in porous filter paper or a liquid lubricant absorbed in a filter paper were charged into a glass tube (0.21 inch I.D. and 7.5 inch long) through its open end. A porous stopper was then inserted into the tube to assure that the paper stayed in place. Five (5) or ten (10) mL of ethanol were then poured into a high pressure view cell. The tube was then inserted upside down into the view cell. The level of the paper was kept higher than that of the ethanol. The view cell was then inserted into an oven. After thermal equilibration, $CO_2$ was allowed into the view cell. The ethanol/$CO_2$ mixture was allowed to expand up to the location of the lubricant or drug and then was contracted back by pressure reduction to below the level of the paper. The procedure was repeated several times. Results of extraction of the lubricant and a development drug candidate (X) are shown in Table 1 below:

TABLE 1

| Substance Extracted | Initial Amount of Solvent (mL) | Temperature (° C.) | Number of Expansion/ Contraction | Starting Amount (g) | Amount Remaining (g) |
| --- | --- | --- | --- | --- | --- |
| LPM Oil | 5 | 35 | 20 | 0.1191 | 0.1059 |
| X | 10 | 35 | 10 | 0.209 | 0.147 |
| X | 10 | 50 | 6 | 0.2047 | 0.176 |

The results of Table 1 demonstrate that the process of solvent expansion-contraction may be used to extract material and leave residual unextracted material away from the extract. It further shows that ethanol, which is a relatively volatile solvent, can be expanded and contracted a great number of times. In the run with drug (X) at 35° C., about 8 mL of solvent were left at the end of the experiment. In the run involving LPM oil and only 5 mL of ethanol, at the end of the last expansion step, the solvent appeared to have nearly completely dissolved in the gaseous/supercritical phase.

EXAMPLE 4

Extraction, Crystallization and Coating by Solvent Expansion-Contraction

Acetaminophen (2 grams) and ethanol (5 mL) were charged into a 10-mL stainless steel vessel. Glass wool and wiremesh were used as filter media and to contain the drug in the vessel. Small, 2-mm stainless steel beads were then poured into the bottom half of the view cell. One end of the vessel was then connected to the inlet valve of the view cell. $CO_2$ was subsequently allowed to flow through the vessel into the view cell. The solvent was repeatedly expanded with $CO_2$ and then contracted back.

Figure 10:
FIG. 10 is a photograph of a stainless steel bead coated with acetaminophen by repeated ethanol drug solution expansion and contraction

Upon expansion, the ethanol solution became supersaturated with acetaminophen, causing it to crystallize on the beads. Contraction was caused by removing $CO_2$ from the solvent—the contracted solvent being more able to dissolve more acetaminophen. Further expansion caused $CO_2$ concentration in the solvent to increase and acetaminophen to crystallize. Repeated expansion-contraction was found to have the effect of depositing more and more acetaminophen on the stainless steel beads. FIG. 10 shows an optical photograph of a stainless steel bead coated with acetaminophen.

EXAMPLE 5

Recrystallization by Solvent Expansion-Contraction

A volume of 10 mL of ethanol was poured into the view cell. A mass of 220 mg of acetaminophen was charged into a glass tube. Polypropylene wool was used to contain the drug within its space in the tube and as a filtering medium that guards against entrainment of any drug particle in the expanding solvent. The tube was then topped with 2 mm stainless steel balls and then inserted into the view cell and into the solvent. After repeated expansion and contraction, only 8 mg of drug was left in the glass tube. Nearly all the drug was collected in the tube, on the stainless steel balls or in the upper half of the view cell. In order to avoid spurting of liquid from the liquid-vapor interface, which tends to redissolve recrystallized material, the rate of purging of the vapor phase was limited to about 2 standard liters per minute of $CO_2$. At least half an hour was allowed for ethanol to dissolve the drug prior to expansion.

While the invention has been described with respect to preferred embodiments and examples, those skilled in the art will readily appreciate that various changes and/or modifications can be made to the invention without departing from the spirit or scope of the invention as defined by the appended claims.

What is claimed is:

1. A method for processing a solute comprising the steps of:
   (a) dissolving said solute, or a portion of said solute, in a liquid solvent that has an affinity for the solubilization of said solute, thereby forming a solvent/solute liquid phase;
   (b) dissolving a gaseous fluid in the solvent/solute liquid phase to form a solvent/solute/gaseous fluid liquid phase;
   (c) causing the solvent/solute/gaseous fluid liquid phase to expand through a retention medium comprising a filter that can retain unsolubilized solute particles;
   (d) causing the gaseous fluid to be dissolved to a concentration such that the solvent/solute/gaseous fluid liquid phase expands until it loses its affinity for the solubilization of said solute and said solute precipitates;
   (e) retaining precipitated solute on a retention medium comprising a filter, which retention medium is the same as the retention medium used in step (c) or is a different retention medium;
   (f) reducing the pressure in the liquid phase to a point where a substantial amount of the gaseous fluid is expelled so as to provide a resultant liquid phase having an affinity for the solubilization of said solute; and
   (g) optionally adding more solute to the liquid phase produced in step (f); and
   further comprising repeating steps (a) through (f) one or more times, or repeating steps (a) through (g) one or more times; and wherein the gaseous fluid is selected from carbon dioxide, nitrous oxide, trifluoromethane, ethane, ethylene, propane, sulfur hexafluoride, propylene, butane, isobutane, pentane, and mixtures thereof.

2. The method of claim 1 wherein the gaseous fluid is carbon dioxide.

3. The method of claim 1 wherein the solute comprises a pharmaceutical drug substance, an impurity or an intermediate product in the synthesis of a pharmaceutical drug substance.

4. The method of claim 1 further comprising repeating steps (a) through (f) at least three times, or repeating steps (a) through (g) at least three times.

5. A process for recrystallizing from a solution material dissolved in said solution, said solution being housed in a enclosure having a top portion and a bottom portion and a longitudinal portion connecting said top portion and said bottom portion, comprising the steps of:
   (a) imbuing in said solution a gaseous fluid that is substantially non-reactive with said dissolved material and other components of said solution, to expand the volume of said solution to a level along the longitudinal portion of said enclosure where crystallization of said dissolved material occurs, said point being below said top portion of said enclosure and above said bottom portion of said enclosure;
   (b) reducing the pressure in the gaseous fluid-imbued solution of step (a) to a point such that gaseous fluid is expelled from said gaseous fluid-imbued solution and the volume of the gaseous fluid-imbued solution is contracted to a level along the longitudinal portion of said enclosure below the point where crystallization of the dissolved material occurred in step (a);
   (c) if any excess material is present at the bottom portion of the enclosure or is present in suspension in the enclosure, allowing said excess material, or a fraction thereof, to be dissolved in the contracted solution;
   (d) optionally adding more material to the contracted solution; and
   (e) repeating steps (a) through (c), or steps (a) through (d), until a substantial portion of the material is recrystallized;
   and wherein the gaseous fluid is selected from carbon dioxide, nitrous oxide, trifluoromethane, ethane, ethylene, propane, sulfur hexafluoride, propylene, butane, isobutane, pentane, and mixtures thereof.

6. The method of claim 5 wherein the gaseous fluid is carbon dioxide.

7. The method of claim 5 wherein said material comprises a pharmaceutical drug substance, an impurity or an intermediate product in the synthesis of a pharmaceutical drug substance.

8. A method for extracting material from a composition comprising the steps of:
  (a) contacting at least a portion of said material with a liquid solvent that has an affinity for the solubilization of said material thereby forming a solvent/material liquid phase;
  (b) dissolving a gaseous fluid in the solvent/material liquid phase to form a solvent/material/gaseous fluid liquid phase wherein the gaseous fluid is dissolved to a concentration such that the solvent/material/gaseous fluid liquid phase loses its affinity for the solubilization of said material and said material precipitates;
  (c) reducing the pressure in the solvent/material/gaseous fluid liquid phase to a point where a substantial amount of the gaseous fluid in the liquid phase is expelled so as to provide a resultant liquid phase having an affinity for the solubilization of said material; and
  (d) repeating steps (a) through (c) until the composition is substantially free of said material; and wherein the gaseous fluid is selected from carbon dioxide, nitrous oxide, trifluoromethane, ethane, ethylene, propane, sulfur hexafluoride, propylene, butane, isobutane, pentane, and mixtures thereof.

9. The method of claim 8 wherein the gaseous fluid is carbon dioxide.

10. The method of claim 8 wherein the material comprises a pharmaceutical drug substance, an impurity or an intermediate product in the synthesis of a pharmaceutical drug substance.

11. A method for conducting chemical reactions to produce reaction product comprising the steps of:
  (a) dissolving one or more reactants in a liquid solvent thereby forming a solvent/reactant liquid phase;
  (b) dissolving a gaseous fluid in the solvent/reactant liquid phase to form a solvent/reactant/gaseous fluid liquid phase, wherein the gaseous fluid has a low affinity for said reaction product;
  (c) continuing to dissolve said gaseous fluid in said solvent/reactant/gaseous fluid liquid phase to a concentration such that the solvent/reactant/gaseous fluid liquid phase loses its solubilization affinity for said reaction product but not its solubilization affinity for said reactants, and said reaction product precipitates;
  (d) retaining precipitated reaction product on a retention medium; and
  (e) reducing the pressure in the solvent/reactant/gaseous fluid liquid phase to a point where a substantial amount of the gaseous fluid in the liquid phase is expelled so as to provide a resultant liquid phase having an affinity for both the solubilization of said reactants and said reaction product;

and further comprising the step of repeating steps (a) through (e) one or more times; and wherein the gaseous fluid is selected from carbon dioxide, nitrous oxide, trifluoromethane, ethane, ethylene, propane, sulfur hexafluoride, propylene, butane, isobutane, pentane, and mixtures thereof.

12. The method of claim 11 wherein the gaseous fluid is carbon dioxide.

13. The method of claim 11 wherein the reactants or reaction product comprise a pharmaceutical drug substance, an impurity or an intermediate product in the synthesis of a pharmaceutical drug substance.

14. The method of claim 11 further comprising the step of repeating steps (a) through (e) at least three times.

* * * * *